US009372744B2

(12) United States Patent
Nishikido et al.

(10) Patent No.: US 9,372,744 B2
(45) Date of Patent: Jun. 21, 2016

(54) METHOD FOR DETECTING FAILURE AND SLAVE STATION FOR USE IN SAME

(75) Inventors: Kenji Nishikido, Osaka (JP); Youichi Hoshi, Kyoto (JP); Shotaro Kusumoto, Kyoto (JP)

(73) Assignee: ANYWIRE CORPORATION, Kyoto (JP)

( * ) Notice: Subject to any disclaimer, the term of this patent is extended or adjusted under 35 U.S.C. 154(b) by 230 days.

(21) Appl. No.: 14/358,502

(22) PCT Filed: Nov. 15, 2011

(86) PCT No.: PCT/JP2011/076235
§ 371 (c)(1),
(2), (4) Date: May 15, 2014

(87) PCT Pub. No.: WO2013/073001
PCT Pub. Date: May 23, 2013

(65) Prior Publication Data
US 2015/0089291 A1    Mar. 26, 2015

(51) Int. Cl.
*G06F 11/00* (2006.01)
*G06F 11/07* (2006.01)
*H04L 12/26* (2006.01)
(Continued)

(52) U.S. Cl.
CPC ........ *G06F 11/0757* (2013.01); *G06F 11/0772* (2013.01); *G06F 11/221* (2013.01); *H04L 12/26* (2013.01); *H04Q 9/00* (2013.01);
(Continued)

(58) Field of Classification Search
CPC ... G06F 11/221; G06F 11/263; H04L 3/0644; H04L 7/0083; H04L 12/26
See application file for complete search history.

(56) References Cited

U.S. PATENT DOCUMENTS 5,619,509 A  *  4/1997  Maruyama ....... G01R 31/31935
                                                        375/357
5,649,096 A  *  7/1997  Desubijana ......... G06F 11/0757
                                                         714/43
(Continued)

FOREIGN PATENT DOCUMENTS

JP    11-103307 A    4/1999
JP    2006-331449 A   12/2006
JP    2011-114449 A    6/2011

OTHER PUBLICATIONS

International Search Report for Application No. PCT/JP2011/076235 dated Dec. 13, 2011.
(Continued)

*Primary Examiner* — Yolanda L Wilson
(74) *Attorney, Agent, or Firm* — Pearne & Gordon LLP

(57) ABSTRACT

A transmission signal transmitted via a common data signal line, includes a management data region different from a control/monitoring data region including data of control data and monitoring data signals. The slave station acquires input information from an input part corresponding to its own station, acquires control data for reference by an output part of another station in a correspondence relation with the input part from the transmission signal, and obtains a pseudo output change timing equal to a true output change timing of the output part based on the control data. A signal configuring data indicating a first failure state when a time difference between the pseudo output change timing and an input change timing of the input part is smaller than a first threshold value or a second failure state when the time difference is larger than a second threshold value is superimposed on the management data region.

17 Claims, 10 Drawing Sheets

(51) Int. Cl.
*G06F 11/22* (2006.01)
*H04Q 9/00* (2006.01)
*G06F 11/263* (2006.01)

(52) U.S. Cl.
CPC ......... *G06F 11/263* (2013.01); *H04Q 2209/10* (2013.01); *H04Q 2209/30* (2013.01); *H04Q 2209/823* (2013.01)

(56) References Cited

U.S. PATENT DOCUMENTS

| | | | | |
|---|---|---|---|---|
| 6,502,212 | B1* | 12/2002 | Coyle | G06F 11/221 710/15 |
| 7,990,880 | B2* | 8/2011 | Emori | H04J 3/0644 370/242 |
| 2001/0023392 | A1* | 9/2001 | Nakatsuhama | G06F 11/0757 702/120 |
| 2004/0243728 | A1* | 12/2004 | Meyer-Grafe | G06F 11/0709 710/1 |
| 2007/0116062 | A1* | 5/2007 | Spalink | G06F 1/14 370/503 |
| 2007/0274349 | A1 | 11/2007 | Emori | |

OTHER PUBLICATIONS

Supplementary European Search Report for Application No. 11875894 dated Jun. 22, 2015.
Written Opinion for Application No. 11875894.5.

* cited by examiner

METHOD FOR DETECTING FAILURE AND SLAVE STATION FOR USE IN SAME

TECHNICAL FIELD

The present invention relates to a method for detecting a failure and a slave station for use in the method which are capable of detecting a failure of an output unit or an input unit in a control/monitoring signal transmission system in which a master station connected to a control unit is connected with a plurality of slave stations corresponding to a plurality of out units and input units or a plurality of controlled devices via a common data signal line for wiring saving of a signal line, and transmission of data is performed according to a transmission synchronization scheme of performing synchronization using a transmission clock. The output unit operates according to an instruction of the control unit, and corresponds to an actuator, a (stepping) motor, a solenoid, an electromagnetic valve, a relay, a thyristor, or the like. Meanwhile, the input unit transmits information related to the output unit to the control unit, and corresponds to a reed switch, a micro switch, a push-button switch, a photoelectric switch, various kinds of sensors, or the like. Further, the controlled device is configured with the output unit and the input unit.

BACKGROUND ART

In control systems including a control unit and a plurality of output units and input units or a plurality of controlled devices, so-called wiring saving of reducing the number of wires has been widely performed. As a general technique for wiring saving, a technique of connecting a master station with a function of performing conversion between a parallel signal and a serial signal and a plurality of slave stations with a control unit and a plurality of output units and input units or a plurality of controlled devices, respectively, and performing data transfer between the master station and the plurality of slave stations via a common data signal line using a serial signal, instead of a parallel connection of connecting each of signal lines extending from a plurality of output units and input units or a plurality of controlled devices directly to a control unit has been widely employed.

In the case in which wiring saving is implemented, when it is difficult for a control unit side to identify a failure of an output unit, an input unit, or a controlled device in a state in which a number of slave stations are connected, it is necessary to check the output unit, the input unit, or the controlled device far away from the control unit, and thus it requires many man-hours to identify a failure spot.

In this regard, the present applicant has considered applying a remote wiring check system disclosed in JP 2011-114449 A as a system in which a disconnection failure of a slave station and an input unit or an output unit is identified at a control unit side. In this remote wiring check system, in a control/monitoring signal transmission system including a single control unit and a plurality of controlled devices, a management data region including connection data indicating a wiring state which is different from a control/monitoring data region including control data (output data) and monitoring data (input data) which are bidirectionally and simultaneously transmitted between a master station and a slave station connected via a wiring-saved data signal line is provided. In the connection data, short circuit information, disconnection information, and normality information are identified. Thus, it is possible to easily check the wiring connection state of the slave station, between the slave station and the input unit, or between the slave station and the output unit without reducing input data (monitoring data) capacity of a signal.

Further, JP 2006-331449 A discloses a slave (slave station) having a function of acquiring start time information when an ON state or an OFF state of an OUT terminal connected with an output device (output unit) has changed by OUT data received through serial communication with a master unit (master station), a function of acquiring stop time information when an ON state or an OFF state of an IN terminal connected with an input device (input unit) has changed, and a calculation function of calculating an operation period of time of the output device based on the start time information and the stop time information. According to this slave (slave station), it is possible to determine whether the output device or the input device is in the normal state, whether a replacement time has approached, or the like by obtaining the operation period of time of the output device or the input device and comparing the obtained operation period of time with setting information used for identifying a normal range of the output device or the input device.

CITATION LIST

Patent Document

Patent Document 1: JP 2011-114449 A
Patent Document 2: JP 2006-331449 A

DISCLOSURE OF THE INVENTION

Problem to be Solved by the Invention

However, in the technique of the related art in which the operation period of time of the output unit or the input unit is obtained in the slave station, there are cases in which it is hard to acquire both the start time information of the OUT terminal to which the output unit is connect and the stop time information of the IN terminal to which the input unit is connected. In other words, when both the output unit and the input unit are connected to a single slave station, the start time information and the stop time information are collected by the same slave station, either one of the start time information and the stop time information is usually acquired in the slave station to which either of the output unit and the input unit is connected. A technique of transferring information between the slave stations to which the output unit and the input unit which are in a correspondence relation are connected, respectively is considered, but since it is a so-called command transmission scheme, it is difficult to employ it in the control/monitoring signal transmission system in which transmission of data is performed according to the transmission synchronization scheme.

In light of the foregoing, it is an object of the present invention to provide a method for detecting a failure and a slave station for use in the same, which are capable of determining failures of an output unit and an input unit which are in a correspondence relation in terms of a mechanical operation in a control/monitoring signal transmission system in which a master station connected to a control unit is connected with a plurality of slave stations corresponding to a plurality of output units, a plurality of input units, and a plurality of controlled devices via a common data signal line, and transmission of data is performed according to a transmission synchronization scheme.

Means for Solving Problem

In a method for detecting a failure according to the present invention, in a control/monitoring signal transmission system in which a master station is connected with a plurality of slave stations via a common data signal line, and transmission of data is performed according to a transmission synchronization scheme, a transmission signal is transmitted via the common data signal line, and includes a management data region different from a control/monitoring data region comprising data of a control data signal and data of a monitoring data signal. A first method for detecting a failure according to the present invention includes acquiring, by the slave station, input information from an input part corresponding to a first slave station as well as acquiring control data from the transmission signal, the control data being referred by the first slave station and being for an output part of the second slave station, the output part being in a correspondence relation with the input part; and obtaining, by the slave station, a pseudo output change timing equal to a true output change timing of the output part based on the control data. The method further includes comparing, by the slave station, a time difference between the pseudo output change timing and an input change timing of the input part with a first threshold value and a second threshold value, determining, by the slave station, a normal state when the time difference is larger than the first threshold value and smaller than the second threshold value, a first failure state when the time difference is smaller than the first threshold value, and a second failure state when the time difference is larger than the second threshold value, and causing, by the slave station, a signal configuring data indicating the first failure state or the second failure state to be superimposed on the management data region.

A second method for detecting a failure according to the present invention includes acquiring, by the slave station, control data of an output part corresponding to a first slave station from a transmission signal as well as acquiring monitoring data from a transmission signal, the monitoring data being referred by the first slave station and being based on input information from an input part of a second slave station, the input part being in a correspondence relation with the output part, and obtaining, by the slave station, a pseudo input change timing equal to a true input change timing of the input part based on the monitoring data. The method further includes comparing, by the slave station, a time difference between an output change timing of the output part and the pseudo input change timing with a first threshold value and a second threshold value, determining, by the slave station, a normal state when the time difference is larger than the first threshold value and smaller than the second threshold value, a first failure state when the time difference is smaller than the first threshold value, and a second failure state when the time difference is larger than the second threshold value, and causing, by the slave station, a signal configuring data indicating the first failure state or the second failure state to be superimposed on a management data region.

As a synchronization technique of the transmission synchronization scheme of the control/monitoring signal transmission system in which the method for detecting a failure according to the present invention is applied, for example, a technique of using a transmission clock generated by a timing generating means equipped in a master station is desirable. In this case, under control of the transmission clock, the master station outputs a series of pulse-like signals to the common data signal line as a control data signal according to a value of control data transferred from a control part, extracts a data value of a monitoring data signal superimposed on a series of pulse-like signals at each clock cycle from each of a plurality of slave stations, and transfers the extracted data value to the control part. Meanwhile, each a plurality of slave stations counts pulses of the series of pulse-like signals, starting from a start signal indicating the beginning of the series of pulse-like signals, extracts data corresponding to its own station from the series of pulse-like signals if a count value is identical to its own station address, and causes the monitoring data signal to be superimposed on the series of pulse-like signals at the same pulse cycle as a clock cycle at which data corresponding to its own station is extracted, extracts data corresponding to its own station from the series of pulse-like signals if a count value is identical to its own station address, or causes the monitoring data signal to be superimposed on the series of pulse-like signals. Here, the synchronization technique is not limited to a certain technique, and it is desirable to employ a technique appropriate to a system design condition.

In the first method for detecting a failure according to the present invention, if there is input information from the input part but the control data of the output part which is in a correspondence relation with the input part indicates absence of output, the slave station may determine that there is an error in the correspondence relation between the output part and the input part, and cause a signal configuring third failure state data indicating non-correspondence to be superimposed on the management data region.

In the method for detecting a failure according to the present invention, a reference address indicating the second slave station of the control data or the monitoring data to be referred to may be identical to or different from an address of the first slave station.

In the method for detecting a failure according to the present invention, the management data region may include a management control data region on which data from the master station is superimposed and a management monitoring data region on which data from the slave station is superimposed, data other than "0" is used as data from the slave station to be superimposed on the management monitoring data region when a failure is detected, and disconnection of the common data signal line may be determined if data extracted from the management monitoring data region in the master station is "0."

A first embodiment of slave station according to the present invention is connected to a common data signal line to which a master station is connect, and includes a synchronizing means, an input means, an output timing detecting means, a failure detecting means, and a management monitoring data transmitting means. The synchronizing means synchronizes with a master station. The input means acquires input information from an input part corresponding to its own slave station. The output timing detecting means acquires control data of an output part which is in a correspondence relation with the input part from a transmission signal, and obtains a pseudo output change timing equal to an output change timing of the output part. The failure detecting means compares a time difference between the pseudo output change timing and an input change timing of the input part with a first threshold value and a second threshold value, and transfers data indicating normal state when the time difference is larger than the first threshold value and smaller than the second threshold value, first failure data when the time difference is smaller than the first threshold value, and second failure data when the time difference is larger than the second threshold value to the management monitoring data transmitting means. The management monitoring data transmitting means causes a signal configuring data indicating the first failure state or the second failure state to be superimposed on the management data region in the transmission signal.

A second embodiment of slave station according to the present invention is connected to a common data signal line to which a master station is connected, and includes a synchronizing means, a control data extracting means, input timing detecting means, a failure detecting means, and a management monitoring data transmitting means. The synchronizing means synchronizes with the master station. The control data extracting means acquires control data related to an output part corresponding to its own slave station from a transmission signal on the common data signal line. The input timing detecting means acquires monitoring data to be referred by its own slave station and being based on input information from an input part which is in a correspondence relation with the output part from the transmission signal, and obtains a pseudo input change timing equal to a true input change timing of the input part based on the monitoring data. The failure detecting means compares a time difference between an output change timing of the output part and the pseudo input change timing with a first threshold value and a second threshold value, and transfers data indicating normal state when the time difference is larger than the first threshold value and smaller than the second threshold value, first failure data when the time difference is smaller than the first threshold value, and second failure data when the time difference is larger than the second threshold value to the management monitoring data transmitting means. The management monitoring data transmitting means causes a signal configuring data indicating the first failure state or the second failure state to be superimposed on the management data region in the transmission signal.

The first embodiment of slave station according to the present invention further includes a non-correspondence detecting means determining that there is an error in a correspondence relation between the output part and the input part if there is input information from the input part but the control data of the output part which is in a correspondence relation with the input part indicates absence of an output.

Effect of the Invention

In the method for detecting a failure according to the present invention, the slave station corresponding to the input part can acquire the control data of the output part which is in a correspondence relation with the input part from the transmission signal to be transmitted to the common data signal line, and the slave station corresponding to the output part can acquire the monitoring data based on the input information from the input part which is in a correspondence relation with the output part from the transmission signal. Thus, it is possible to obtain the time difference between the pseudo output change timing equal to the output change timing of the output part and the input change timing of the input part or the time difference between the output change timing of the output part and the pseudo input change timing equal to the input change timing of the input part. Further, it is possible to determine a failure state of the output part or the input part in the slave station by comparing the time difference with the first threshold value and the second threshold value. Furthermore, the slave station causes data indicating the failure state to be superimposed on the transmission signal to be transmitted to the common data signal line, and thus in the control/monitoring signal transmission system in which transmission of data is performed according to the transmission synchronization scheme, the master station side can detect a failure of the output part or the input part.

Further, as a region on which the signal configuring data indicating the failure state is superimposed, the management data region different from the control/monitoring data region for exchanging a data signal with each slave station is provided. Thus, in the transmission synchronization scheme, it is possible to transmit the signal configuring data indicating the failure state at the same time as the control data and the monitoring data as a one frame transmission cycle without affecting the existing control/monitoring data region. In other words, the present invention can be applied to the existing system as well.

Further, if there is input information from the input part but the control data of the output part which is in a correspondence relation with the input part indicates absence of output, it is possible to detect erroneous wiring as well as a failure by determining that there is an error in the correspondence relation between the output part and the input part.

Further, data other than "0" is used as data from the slave station to be superimposed on the management monitoring data region when a failure is detected, and if data extracted from the management monitoring data region in the master station is "0," it means a state in which information output from the slave station is not transmitted to the master station via the common data signal line. Thus, at this time, a disconnection of the common data signal line can be determined, and it is possible to detect a disconnection of the common data signal line as well as a failure.

In the present invention, a reference address of the control data or the monitoring data to be referred to may be identical to or different from an address of its own station, but when the reference address is identical to the address of its own station, a configuration can be simplified. Further, in the present invention, even when the reference address is identical to an address of its own station, it is not limited to a case in which both of the output part and the input part are connected to a single slave station, and there are cases in which the output part and the input part are connected to different slave stations, respectively.

Further, in the first embodiment of slave station according to the present invention can be used as the slave station corresponding to the input part, and the second embodiment of slave station can be used as the slave station corresponding to the output part.

MODE(S) FOR CARRYING OUT THE INVENTION

Hereinafter, an exemplary embodiment of a control/monitoring signal transmission system employing a method for detecting a failure according to the present invention will be described with reference to FIGS. 1 to 10.

Figure 2:
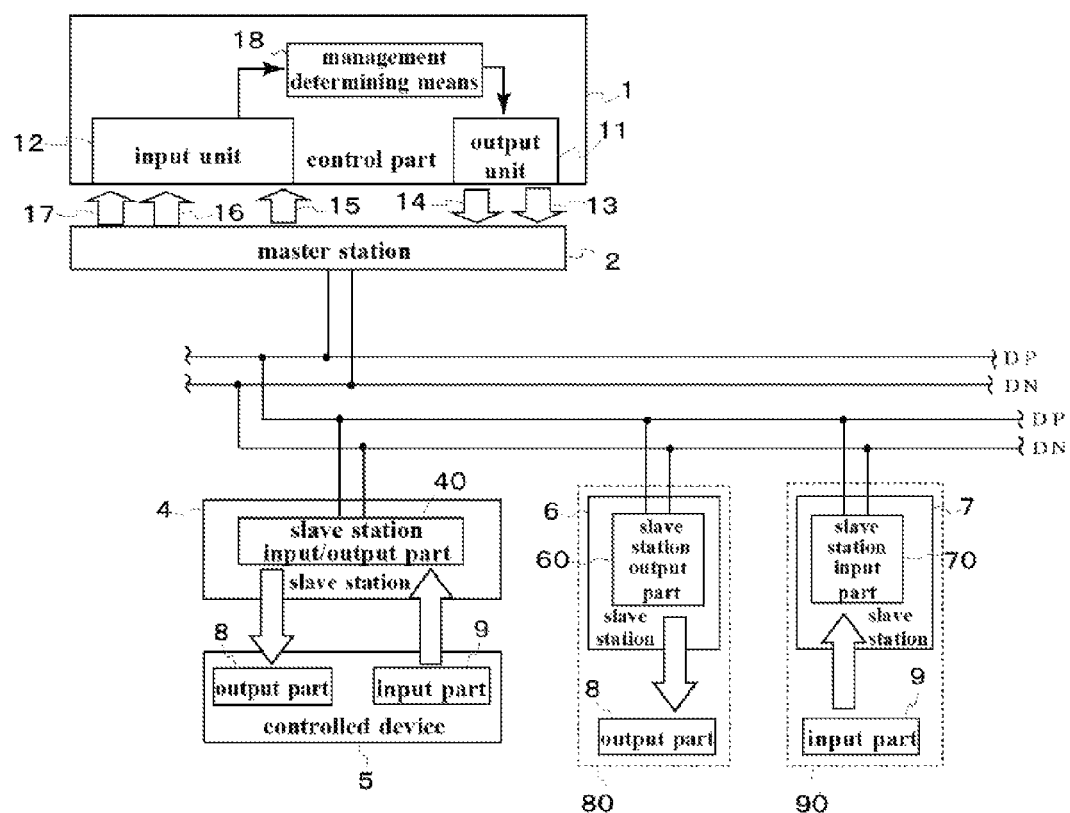
FIG. 2 is a system configuration diagram illustrating a schematic configuration of the control/monitoring signal transmission system.

The control/monitoring signal transmission system includes a single master station 2 connected to a control part 1 and common data signal lines DP and DN (which may be hereinafter referred to as "transmission line"), and a plurality of input/output slave stations 4, a plurality of output slave stations 6, and a plurality of input slave stations 7 which are connected to the common data signal lines DP and DN as illustrated in FIG. 2. In FIG. 2, for convenience of illustration, one station is illustrated as each type of slave station, but there is no limitation to a type of a slave station or the number of slave stations connected to the common data signal lines DP and DN.

The input/output slave station 4, the output slave station 6, and the input slave station 7 perform either or both of a signal output process of outputting a signal to an output part 8 that operates according to an output instruction of the control part 1 and an input signal process of receiving a signal from an input part 9 that acquires input information send to the control part 1. Examples of the output part 8 include an actuator, a (stepping) motor, a solenoid, an electromagnetic valve, a relay, a thyristor, and a lamp, and examples of the input part 9 include a reed switch, a micro switch, a push-button switch, a photoelectric switch, and various kinds of sensors. The input/output slave station 4 is connected to a controlled device 5 including the output part 8 and the input part 9, the output slave station 6 is connected to the output part 8, and the input slave station 7 is connected to the input part 9. The output slave station 6 may be an output unit-integrated slave station 80 in which the output part 8 is equipped, and the input slave station 7 may be an input unit-integrated slave station 90 in which the input part 9 is equipped.

Examples of the control part 1 include a programmable controller and a computer, and the control part 1 includes an output unit 11 that transmits control data 13 and management control data 14 and an input unit 12 that receives data 15 of monitoring data signals which are transmitted from the input/output slave station 4 and the input slave station 7, first management monitoring data 16, and second management monitoring data 17. The output unit 11 and the input unit 12 are connected to the master station 2. The control part 1 further includes a management determining means 18 that calculates data to be transmitted from the output unit 11 based on data received from the input unit 12.

Figure 3:
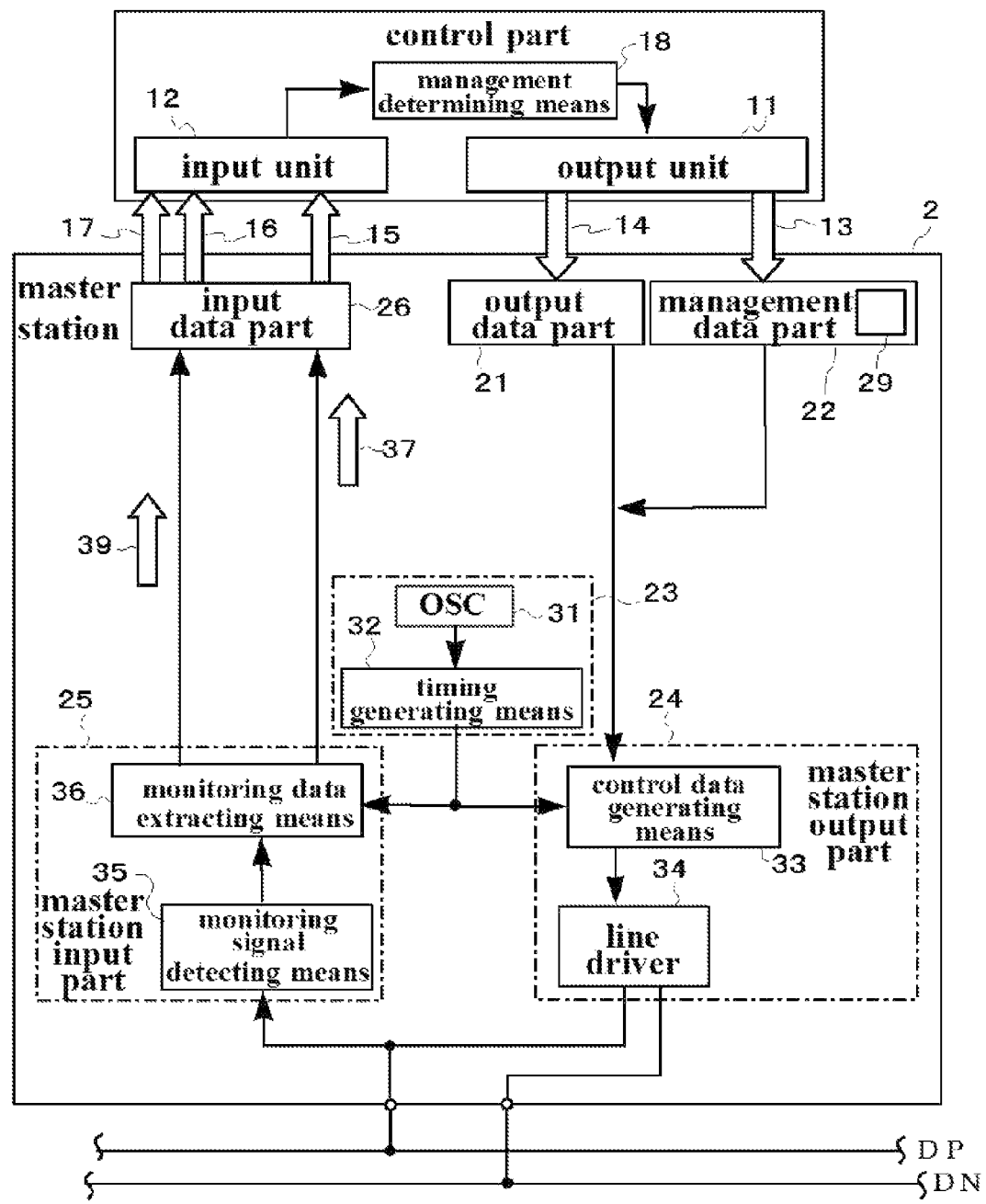
FIG. 3 is a system configuration diagram of a master station.

The master station 2 includes an output data part 21, a management data part 22, a timing generating part 23, a master station output part 24, a master station input part 25, and an input data part 26 as illustrated in FIG. 3. The master station 2 is connected to the common data signal lines DP and DN. The master station 2 transmits a control data signal (which may be hereinafter referred to as a "transmission clock signal") which is a series of pulse-like signals corresponding to a transmission signal according to the present invention to the common data signal lines DP and DN, and transfers the monitoring data 15, the first management monitoring data 16, and the second management monitoring data 17 extracted from a monitoring data signal and a management monitoring data signal transmitted from the input/output slave station 4, the output slave station 6, or the input slave station 7 (which are hereinafter referred to collectively as "slave stations 4, 6, and 7") to the input unit 12 of the control part 1.

The output data part 21 converts parallel data received from the output unit 11 of the control part 1 as the control data 13 into serial data, and transfers the serial data to the master station output part 24.

Figure 10:
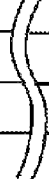
FIG. 10 is a schematic diagram of an IDX address data table stored in a master station.

The management data part 22 includes a storage means 29 that stores an IDX address table in which information about each of the slave stations 4, 6, and 7 is collected. The IDX address table includes at least data used for identifying any one of the input/output slave station 4, the output slave station 6, and the input slave station 7 corresponding to the output part 8 or the input part 9 serving as a failure check target, but in this embodiment, head addresses of the slave stations 4, 6, and 7 are used. FIG. 10 illustrates an exemplary IDX address table using a head address.

For a station that is allocated an address #ad0, the monitoring data signal has a 1-bit data value, and data of the IDX address table has a value in which #ad0 and #ad1 are consecutive as illustrated in FIG. 10. Meanwhile, for a station that is allocated an address #ad1, the monitoring data signal has a 2-bit data value, and thus a pulse of #ad2 is also allocated to the same station to which #ad1 is allocated. Thus, in data of the IDX address table, #ad3 is stored as a value next to #ad1. In this embodiment, even when the monitoring data signal has the 1-bit data value, #ad0 is also regarded as a head address, similarly to #ad1.

The timing generating part 23 includes an oscillation circuit (OSC) 31 and a timing generating means 32, and the timing generating means 32 generates a timing clock of the system based on the OSC 31, and transfers the generated timing clock to the master station output part 24.

The master station output part 24 includes a control data generating means 33 and a line driver 34. The control data generating means 33 transmits the transmission clock signal to the common data signal lines DP and DN through the line driver 34 as a series of pulse-like signals based on data received from the output data part 21 and the management data part 22 and the timing clock received from the timing generating part 23.

Figure 1:
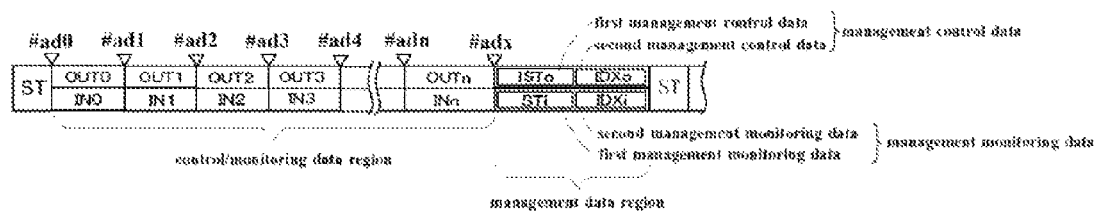
FIG. 1 is a schematic diagram illustrating a transmission scheme between a master station and a plurality of slave stations in an embodiment of control/monitoring signal transmission system employing a method for detecting a failure according to the present invention.
Figure 9:
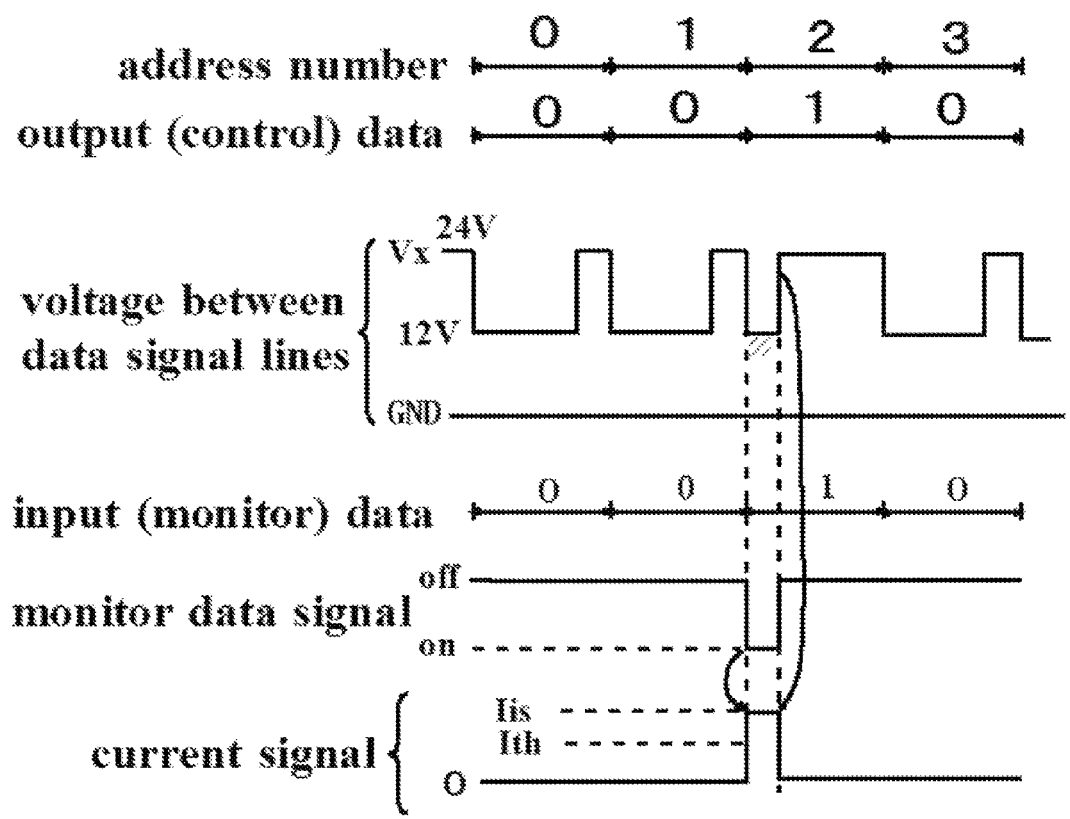
FIG. 9 is a time chart diagram of a transmission clock signal.

The transmission clock signal includes a control/monitoring data region consecutive to a start signal ST and a management data region consecutive to the control/monitoring data region as illustrated in FIG. 1. The control/monitoring data region includes data OUTn (n is an integer) of the control data signal transmitted from the master station 2 and data INn (n is an integer) of the monitoring data signal transmitted from the input/output slave station 4 or the input slave station 7. In the pulse of the transmission clock signal, as illustrated in FIG. 9, a second half of one cycle has a high potential level (+24V in this embodiment), a first half has a low potential level (+12V in this embodiment), pulse widths of the first half of the pulse having a low potential level serves as an output data period of time, and similarly, the first half of the pulse having a low potential level serves as an input data period of time. Further, the pulse widths of the low potential level indicates the data OUTn of the control data signal, and the presence or absence of an electric current to be superimposed on the low potential level indicates the data INn of the monitoring data signal. In this embodiment, when one cycle of the transmission clock signal is assumed to be t0, the pulse width of the low potential level extends from (¼) t0 to (¾) t0, but it is preferable that the pulse width of the low potential level be decided as needed without limitation as long as it corresponds to each data value of the control data 13 input from the control part 1. Further, it is possible to decide the input data period of time and the output data period of time, as needed. For example, similarly to this embodiment, the first half (low potential level) of the pulse may be used as the input data period of time, and the pulse width of the second half (high potential level) of the pulse may be used as the output data period of time. In the opposite manner, similarly to this embodiment, the first half (low potential level) of the pulse may be used as the output data period of time, and the second half (high potential level) of the pulse may be used as the input data period of time. Alternatively, the second half (high potential level) of the pulse may be used as the output data period of time and the input data period of time. The same applies even when the second half of one cycle of the transmission clock signal has the low potential level. In FIG. 1, an upper part indicates the output data period of time, and a lower part indicates the input data period of time.

The management data region of the transmission clock signal includes a management control data region on which the management control data signal transmitted from the master station 2 is superimposed and a management monitoring data region on which the management monitoring data signals transmitted from the slave stations 4, 6, and 7 are superimposed. Management control data to be transmitted through the management control data signal includes a first management control data ISTo and second management control data IDXo, and is indicated by the pulse width of the low potential level, similarly to the data OUTn of the control data signal. Further, management monitoring data to be transmitted through the management monitoring data signal includes first management monitoring data STi and second management monitoring data IDXi, and is indicated by the presence or absence of an electric current to be superimposed on the low potential level, similarly to the data INn of the monitoring data signal. In this embodiment, the first management control data ISTo and the second management control data IDXo are used as instruction data used for identifying a type of data which the slave stations 4, 6, and 7 are requested to transmit or address data used for identifying any one of the slave stations 4, 6, and 7. Meanwhile, the first management monitoring data STi and the second management monitoring data IDXi are used as data indicating a state of its own station or a time difference data, and data other than "0" is consistently transmitted as the management monitoring data. The details will be described later.

The start signal ST is a signal that has the same potential level as the high potential level of the transmission clock signal and is longer than one cycle of the transmission clock signal.

The master station input part 25 includes a monitoring signal detecting means 35 and a monitoring data extracting means 36. The monitoring signal detecting means 35 detects the monitoring data signal and the management monitoring data signal transmitted from the slave stations 4, 6, and 7 via the common data signal lines DP and DN. The data values of the monitoring data signal and the management monitoring data signal are indicated by the presence or absence of an electric current to be superimposed on the low potential level as described above, and after the start signal ST is transmitted, first, the monitoring data signals are sequentially received from the input/output slave station 4 and the input slave station 7, and then the management monitoring data signal is received from any one of the slave stations 4, 6, and 7. The monitoring data extracting means 36 extracts the data of the monitoring data signal and the management monitoring data signal in synchronization with the signal of the timing generating means 32. Then, the data of the monitoring data signal is transmitted to the input data part 26 as serial input data 37. Management monitoring data 39 extracted from the management monitoring data signal is also transmitted to the input data part 26.

The input data part 26 converts the serial input data 37 received from the master station input part 25 into parallel data, and transmits the parallel data to the input unit 12 of the control part 1 as the monitoring data 15. Further, the input data part 26 separates the management monitoring data 39 received from the master station input part 25 into the first management monitoring data 16 and the second management monitoring data 17, and transmits the first management monitoring data 16 and the second management monitoring data 17 to the input unit 12.

Figure 4:
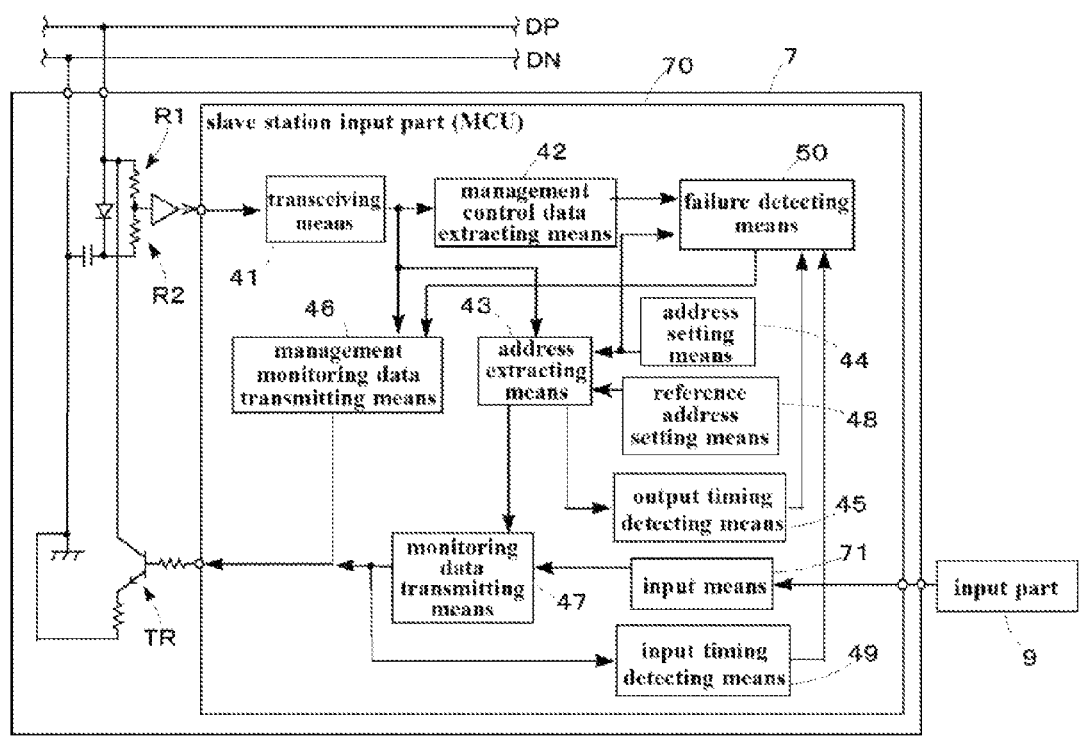
FIG. 4 is a system configuration diagram of an input slave station.

The input slave station 7 corresponds to a first embodiment of slave station according to the present invention, and includes a slave station input part 70 including a transceiving means 41, a management control data extracting means 42, an address extracting means 43, an address setting means 44, an output timing detecting means 45, a management monitoring data transmitting means 46, a monitoring data transmitting means 47, a reference address setting means 48, an input timing detecting means 49, an input means 71, and a failure detecting means 50 as illustrated in FIG. 4. The input slave station 7 of this embodiment includes a MCU standing for a micro computer control unit as an internal circuit, and the MCU functions as a slave station input part 70. A calculation or storage necessary in processing is performed using a central processing unit (CPU), a random access memory (RAM), and a read only memory (ROM) equipped in the MCU (hereinafter, an "MCU 70"), but illustration of a relation among the CPU, the RAM, and the ROM in processing of the components configuring the slave station input part 70 is omitted for convenience of description.

The transceiving means 41 receives the transmission clock signal to be transmitted to the common data signal lines DP and DN, and transfers the transmission clock signal to the management control data extracting means 42, the address extracting means 43, and the management monitoring data transmitting means 46. The management control data extracting means 42 extracts data of the management control data signal from the management data region of the transmission clock signal, and transfers the extracted data to the failure detecting means 50. Meanwhile, the address extracting means 43 counts a pulse, starting from the start signal ST indicating the beginning of the transmission clock signal, transfers the control data signal to the monitoring data transmitting means 47 at a timing at which the count value is identical to its own station address data set by the address setting means 44, and transfers the control data signal to the output timing detecting means 45 at a timing at which the count value is identical to reference address data set by the reference address setting means 48.

If the state of the control data signal transferred from the address extracting means 43 changes, for example, in the case in which a narrow pulse width means "on" and a wide pulse width means "off," if a state of a signal which has been "off" until then changes to "on," the output timing detecting means 45 detects a timing at which the change is made, and transfers "high" data to the failure detecting means 50 as a pseudo output change timing. Further, if a state of a signal which has been "on" until then changes to "off," the output timing detecting means 45 detects a timing at which the change is made, and transfers "high" data to the failure detecting means 50 as a pseudo output change timing.

The monitoring data transmitting means 47 turns on or off a base current of a transistor TR based on serial data transferred from the input means 71 at a timing at which the control data signal is transferred from the address extracting means 43. In a case in which the base current is turned "on," the transistor TR is turned "on," and a current signal serving as the monitoring data signal is output to the data signal lines DP and DN. In this embodiment, as illustrated in FIG. 9, in a case in which the data value of the monitoring data signal is "1," an electric current (for example, 30 mA) of a predetermined value Ith or more is assumed to flow. Thus, for example, the monitoring data for the addresses 0 (#ad0), 1 (#ad1), 2 (#ad2), and 3 (#ad3) of the signal illustrated in FIG. 9 are indicated by "0," "0," "1," and "0." Further, the data transferred from the input means 71 to the monitoring data transmitting means 47 is data based on an input from the input part 9, and is based on a current signal or a voltage signal indicating "on" or "off" of the switch, for example, when an on-off switch is connected as the input part 9.

In order to turn "on" or "off" the base current of the transistor TR, a signal transferred from the monitoring data transmitting means 47 to the transistor TR is also input to the input timing detecting means 49. If the state of the signal changes, specifically, if the state of the signal of turning "off" the transistor TR until then changes a state for turning "on," the input timing detecting means 49 detects a timing at which the change is made, and transfers "high" data to the failure detecting means 50 as an input change timing. Further, if the state of the signal of turning "on" the transistor TR until then changes a state for turning "off," the input timing detecting means 49 detects a timing at which the change is made, and transfers "high" data to the failure detecting means 50 as an input change timing.

The management monitoring data transmitting means 46 counts a pulse, starting from the start signal ST of the transmission clock signal to obtain a timing of the management data region. Further, based on the data transferred from the failure detecting means 50, the management monitoring data transmitting means 46 outputs the base current of the transistor TR, and outputs the current signal serving as the management monitoring data signal to the data signal lines DP and DN.

Figure 5:
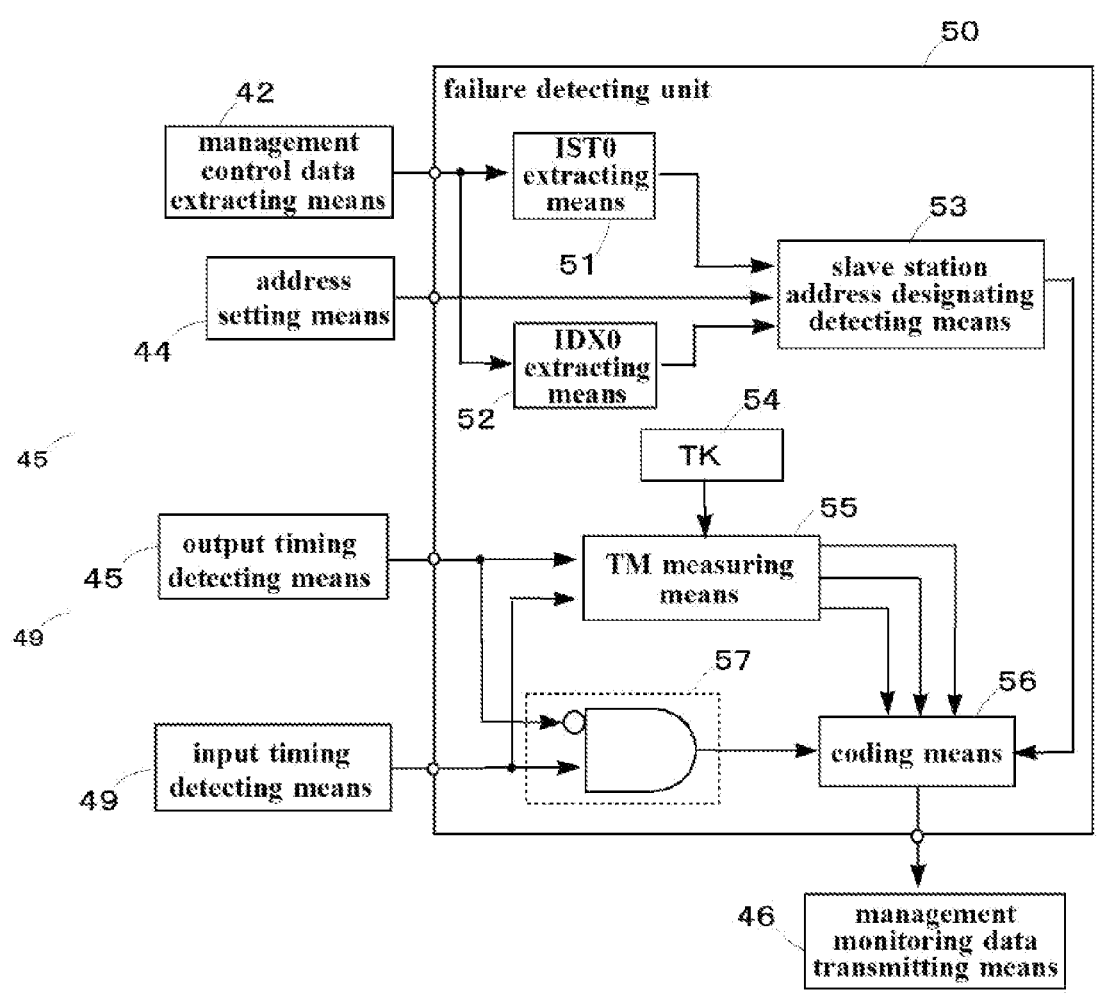
FIG. 5 is a system configuration diagram of a failure detecting means.

The failure detecting means 50 includes an ISTo extracting means 51, an IDXo extracting means 52, a slave station address designation detecting means 53, a threshold value storage unit (TK) 54, a TM measuring means 55, a coding means 56, and a non-correspondence detecting means 57 as illustrated in FIG. 5.

The ISTo extracting means 51 extracts the first management control data ISTo from the data of the management control data signal transferred from the management control data extracting means 42, and transfers the first management control data ISTo to the slave station address designation detecting means 53. The IDXo extracting means 52 extracts the second management control data IDXo from the data of the management control data signal transferred from the management control data extracting means 42, and transfers the second management control data IDXo to the slave station address designation detecting means 53. Further, its own station address data is transferred from the address setting means 44 to the slave station address designation detecting means 53.

The slave station address designation detecting means 53 compares the second management control data IDXo with the data value of its own station address, and transfers the first management control data ISTo to the coding means 56 if the second management control data IDXo is identical to the data value of its own station address.

Figure 8:
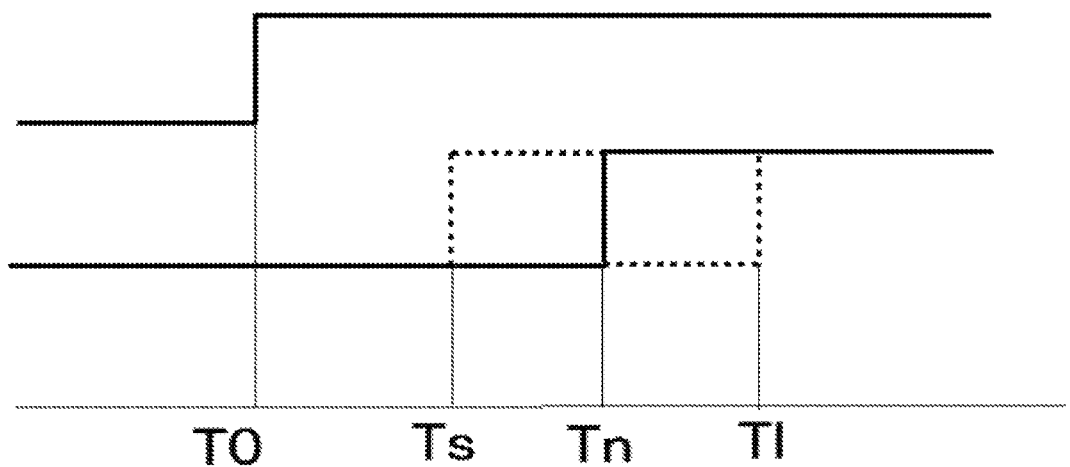
FIG. 8 is a time chart diagram illustrating a principle of detecting a failure in a failure detecting means.

The TM measuring means 55 performs the failure detection process based on the pseudo output change timing transferred from the output timing detecting unit 45, the input change timing transferred from the input timing detecting means 49, and the threshold values (the first threshold value and the second threshold value) transferred from the threshold value storage means 54. In other words, the TM measuring means 55 compares a time difference between a pseudo output change timing T0 and an input change timing Tn with a first threshold value Ts and a second threshold value Tl as illustrated in FIG. 8. Then, the TM measuring means 55 outputs information indicating a first failure state when the time difference is smaller than the first threshold value Ts, information indicating a second failure state when the time difference is larger than the second threshold value Tl, and information indicating a normal state when the time difference is between the first threshold value Ts and the second threshold value Tl to the coding means 56 together with the time difference data. Further, the first threshold value and the second threshold value stored in the threshold value storage means 54 are downloaded from the control part 1 side, and the download process will be described later.

The coding means 56 converts data output from the TM measuring means 55 based on the first management control data ISTo transferred from the slave station address designation detecting means 53 into predetermined coding data, and the transfers the converted coding data to the management monitoring data transmitting means 46. Specifically, if the first management control data ISTo is data to instruct disconnection detection or failure detection of the transmission line, firstly, coding data indicating an abnormal state corresponding to a predetermined first failure state or second failure state or a normal state are transferred to the management monitoring data transmitting means 46 as the first management monitoring data STi, then time difference data indicating the first failure state or the second failure state or time difference data indicating the normal state are transferred to the management monitoring data transmitting means 46 as the second management monitoring data IDXi.

The non-correspondence detecting means 57 receives an inhibition signal by the pseudo output change timing from the output timing detecting unit 45 and a signal of the input change timing from the input timing detecting means 49, and outputs a logical product of the two signals to the coding means 56. In other words, if the input change timing signal as the input information from the input part 9 is "high," and there is no change in output of reference control data of the output part 8 of another slave station having a correspondence relation with the input part 9, the pseudo output change timing is "low," and thus a failure signal indicating that there is an error in a correspondence relation between the output part 8 of another slave station and the input part 9 is output to the coding means 56. Upon receiving the failure signal, the coding means 56 converts the failure signal into predetermined coding data, and transfers coding data indicating a third failure state to the management monitoring data transmitting means 46 as the first management monitoring data STi.

Figure 6:
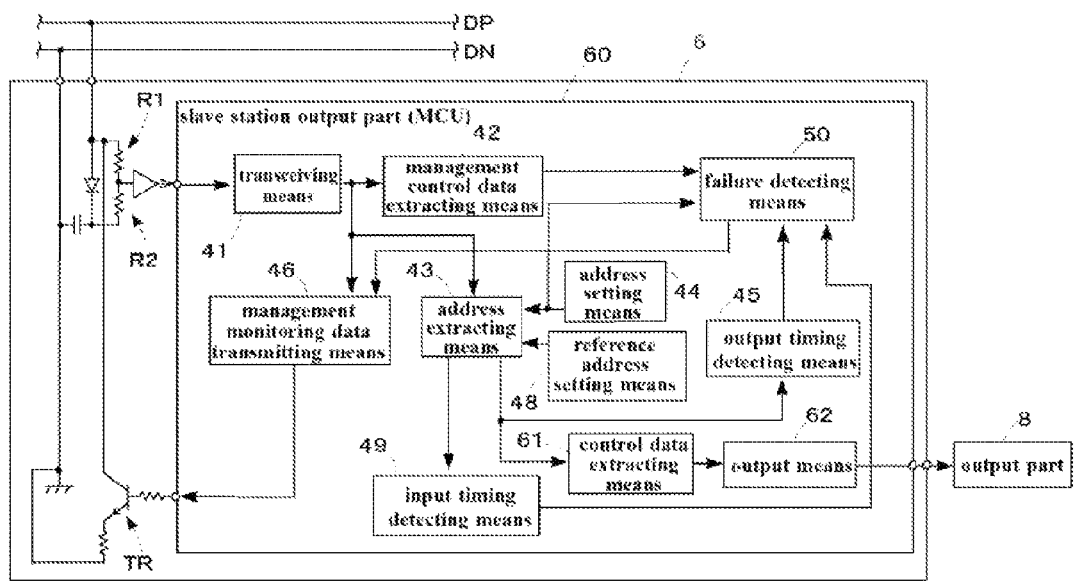
FIG. 6 is a system configuration diagram of an output slave station.

The output slave station 6 corresponds to a second embodiment of slave station of the present invention, and includes a slave station output part 60 including a transceiving means 41, a management control data extracting means 42, an address extracting means 43, an address setting means 44, an output timing detecting unit 45, a management monitoring data transmitting means 46, a reference address setting means 48, an input timing detecting means 49, a control data extracting means 61, an output means 62, and a failure detecting means 50 as illustrated in FIG. 6. The output slave station 6 of this embodiment also includes an MCU standing for a micro computer control unit as an internal circuit, similarly to the input slave station 7, and the MCU functions as the slave station output part 60. Similarly to the MCU 70, a calculation or storage necessary in processing of the output slave station 6 is performed using a CPU, a RAM, and a ROM equipped in the MCU (hereinafter, an "MCU 60"), but illustration of a relation among the CPU, the RAM, and the ROM in processing of the components configuring the slave station output part 60 is omitted for convenience of description. Further, components which are substantially the same as the components of the input slave station 7 are denoted by the same reference numerals, and a description thereof is omitted or simplified.

The address extracting means 43 of the output slave station 6 counts a pulse, starting from the start signal ST indicating the beginning of the transmission clock signal, and transfers the control data signal to the output timing detecting unit 45 and the control data extracting means 61 at a timing at which the count value is identical to its own station address data set by the address setting means 44. Further, the address extracting means 43 transfers the monitoring data signal to the input timing detecting means 49 at a timing at which the count value is identical to the reference address data set by the reference address setting means 48.

The control data extracting means 61 extracts data values from the control data signal transferred from the address extracting means 43, and transfers the data values to the output means 62 as serial data. The output means 62 converts the serial data transferred from the control data extracting means 61 into parallel data, outputs the parallel data to the output part 8, and causes the output part 8 to perform a predetermined operation.

If the state of the monitoring data signal transferred from the address extracting means 43 changes, for example, in the case in which "on" indicates the presence of an electric current and "off" indicates the absence of an electric current, if the state of the signal which has been "off" until then changes to "on," the input timing detecting means 49 detects a timing at which the change is made, and transfers "high" data to the failure detecting means 50 as the pseudo input change timing. Further, if the state of the signal which has been "on" until then changes to "off," the input timing detecting means 49 detects a timing at which the change is made, and transfers "high" data to the failure detecting means 50 as the pseudo input change timing.

Figure 7:
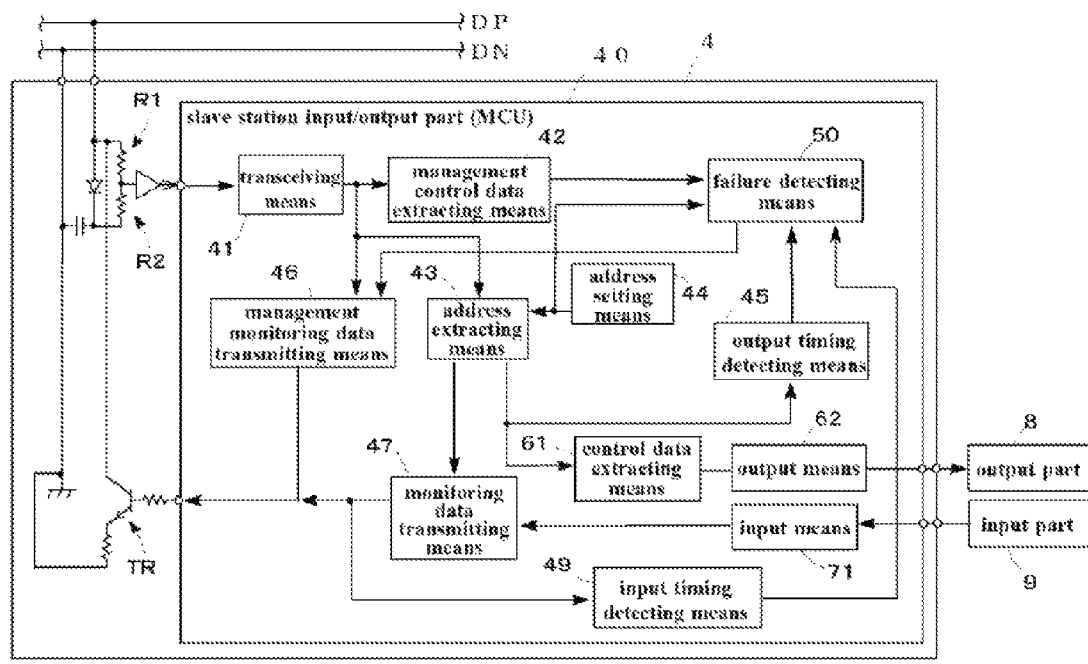
FIG. 7 is a system configuration diagram of an input/output slave station.

The input/output slave station 4 includes a slave station input/output part 40 including a transceiving means 41, a management control data extracting means 42, an address extracting means 43, an address setting means 44, an output timing detecting unit 45, a management monitoring data transmitting means 46, a monitoring data transmitting means 47, an input timing detecting means 49, a control data extracting means 61, an output means 62, an input means 71, and a failure detecting means 50 as illustrated in FIG. 7. The input/output slave station 4 of this embodiment also includes an MCU standing for a micro computer control unit as an internal circuit, similarly to the output slave station 6 and the input slave station 7, and the MCU functions as the slave station input/output part 40. Similarly to the MCU 60 and the MCU 70, a calculation or storage necessary in processing of the input/output slave station 4 is performed using a CPU, a RAM, and a ROM equipped in the MCU (hereinafter, an "MCU 40"), but illustration of a relation among the CPU, the RAM, and the ROM in processing of the components configuring the slave station input/output part 40 is omitted for convenience of description.

Both of the output part 8 and the input part 9 which are in a correspondence relation are connected to the input/output slave station 4. Further, both the process of extracting the control data of the output part 8 and the process of transmitting the monitoring data signal based on the input information of the input part 9 are performed based on the data value of its own station address. In other words, the pseudo output change timing of the output part 8 having the correspondence relation with the input part 9 corresponding to its own station can be obtained based on the data value of its own station address. Thus, the input/output slave station 4 does not include the reference address setting means 48. The remaining components are substantially the same as the components of the output slave station 6 or the input slave station 7 and denoted by the same reference numerals, and thus a description thereof is omitted.

Next, a process of a method for detecting a failure in the control/monitoring signal transmission system having the above-described configuration will be described.

The control part 1 outputs the management control data 14 to instruct disconnection detection or failure detection of the transmission line to the master station 2 at an appropriately set timing or in response to an arbitrary input instruction by the user. The master station 2 that has received the management control data 14 outputs the first management control data ISTo to request information indicating the presence or absence of disconnection detection or failure detection of the transmission line and the second management control data IDXo designating one data included in a data group stored in the IDX address table. Further, the IDX address data table illustrated in FIG. 10 is already created and stored in the management data part 22 of the master station 2, and at each transmission cycle including the start signal ST and the control/monitoring data region and the management data region subsequent thereto, the head addresses allocated to all the slave stations 4, 6, and 7 are sequentially designated according to the second management control data IDXo.

The designating of data of the IDX address table according to the second management control data IDXo is performed using a table number. In other words, first, index address data (#ad0) of a table number 1 is selected and output as the second management control data IDXo. Further, a sequential change to the head address data corresponding to each table number is performed at each transmission cycle. Here, there is no limitation to the order in which data of the IDX address table is designated according to the second management control data IDXo, and, for example, a priority order may be given according to a function.

Each of the slave stations 4, 6, and 7 causes the management monitoring data signal including the first management monitoring data STi indicating abnormality or normality and the second management monitoring data IDXi serving as the time difference data of the first failure state, the second failure state, or the normal state to be superimposed on the management monitoring data region if the second management control data IDXo is identical to its own station address and the first failure state, the second failure state, or the normal state is detected in the TM measuring means 55. Upon receiving the management monitoring data signal, the master station 2 extracts the first management monitoring data 16 and the second management monitoring data 17 from the management the monitoring data signal, and transfers the first management monitoring data 16 and the second management monitoring data 17 to the control part 1.

The control part 1 performs predetermined processing according to content of the first management monitoring data 16. Specifically, when the first management monitoring data 16 indicates the abnormal state, the control part 1 performs a display indicating abnormality. Further, when the management monitoring data is "0," the occurrence of a disconnection of the common data signal line is determined and displayed.

Through the above-described process, the control part 1 can detect the presence or absence of a failure on each of the slave stations 4, 6, and 7. Further, when a failure is detected, since it is possible to obtain the time difference data between the output change timing of the output unit and the input change timing of the input unit, it is possible to identify a factor causing a failure according to content of the data to some extent.

Further, the first threshold value and the second threshold value can be changed by the control unit side. In this case, as needed, data indicating that the first threshold value and the second threshold value are changed and data of the changed first threshold value and the changed second threshold value may be superimposed on the management control data region and extracted by the slave stations 4, 6, and 7.

EXPLANATIONS OF LETTERS OR NUMERALS

1 control part
2 master station
4 input/output slave station
5 controlled device
6 output slave station
7 input slave station
8 output part
9 input part
11 output unit
12 input unit
13 control data
14 management control data
15 data of monitoring data signal
16 first management monitoring data
17 second management monitoring data
18 management determining means
21 output data part
22 management data part
23 timing generating part
24 master station output part
25 master station input part
26 input data part
29 storage means
31 OSC (oscillation circuit)
32 timing generating means
33 control data generating means
34 line driver
35 monitoring signal detecting means
36 monitoring data extracting means
37 input data
39 management monitoring data
40 slave station input/output part
41 transceiving means
42 management control data extracting means
43 address extracting means
44 address setting means
45 output timing detecting means
46 management monitoring data transmitting means
47 monitoring data transmitting means
48 reference address setting means
49 input timing detecting means
50 failure detecting means
51 ISTo extracting means
52 IDXo extracting means
53 slave station address designation detecting means
54 threshold value storage means (TK)
55 TM measuring means
56 coding means
57 non-correspondence detecting means
60 slave station output part
61 control data extracting means
62 output means
70 slave station input part
71 input means
80 output unit-integrated slave station
90 input unit-integrated slave station
TR transistor

What is claimed is:

1. A method for detecting a failure in a control/monitoring signal transmission system in which a master station is connected with a plurality of slave stations via a common data signal line, and transmission of data is performed according to a transmission synchronization scheme, the method comprising:

acquiring, by the slave station, input information from an input part corresponding to a first slave station as well as acquiring control data from a transmission signal, the control data being referred by the first slave station and being for an output part of the second slave station, the output part being in a correspondence relation with the input part, the transmission signal being transmitted via the common data signal line and including a management data region different from a control/monitoring data region comprising data of a control data signal and data of a monitoring data signal;

obtaining, by the slave station, a pseudo output change timing equal to a true output change timing of the output part based on the control data;

comparing, by the slave station, a time difference between the pseudo output change timing and an input change timing of the input part with a first threshold value and a second threshold value;

determining, by the slave station, a normal state when the time difference is larger than the first threshold value and smaller than the second threshold value, a first failure state when the time difference is smaller than the first threshold value, and a second failure state when the time difference is larger than the second threshold value; and causing, by the slave station, a signal configuring data indicating the first failure state or the second failure state to be superimposed on the management data region.

2. The method for detecting the failure according to claim 1, wherein if there is input information from the input part but the control data of the output part which is in a correspondence relation with the input part indicates absence of output, the slave station determines that there is an error in the correspondence relation between the output part and the input part, and causes a signal configuring third failure state data indicating non-correspondence to be superimposed on the management data region.

3. The method for detecting the failure according to claim 2, wherein a reference address indicating the second slave station of the control data or the monitoring data to be referred to is identical to an address of the first slave station.

4. The method for detecting the failure according to claim 2, wherein a reference address indicating the second slave station of the control data or the monitoring data to be referred to is different from an address of the first slave station.

5. The method for detecting the failure according to claim 2, wherein the management data region comprises a management control data region on which data from the master station is superimposed and a management monitoring data region on which data from the slave station is superimposed, data other than "0" is used as data from the slave station to be superimposed on the management monitoring data region when a failure is detected, and disconnection of the common data signal line is determined if data extracted from the management monitoring data region in the master station is "0".

6. The method for detecting the failure according to claim 1,
wherein a reference address indicating the second slave station of the control data or the monitoring data to be referred to is identical to an address of the first slave station.

7. The method for detecting the failure according to any one of claim 6,
wherein the management data region comprises a management control data region on which data from the master station is superimposed and a management monitoring data region on which data from the slave station is superimposed, data other than "0" is used as data from the slave station to be superimposed on the management monitoring data region when a failure is detected, and disconnection of the common data signal line is determined if data extracted from the management monitoring data region in the master station is "0".

8. The method for detecting the failure according to claim 1,
wherein a reference address indicating the second slave station of the control data or the monitoring data to be referred to is different from an address of the first slave station.

9. The method for detecting the failure according to any one of claim 8,
wherein the management data region comprises a management control data region on which data from the master station is superimposed and a management monitoring data region on which data from the slave station is superimposed, data other than "0" is used as data from the slave station to be superimposed on the management monitoring data region when a failure is detected, and disconnection of the common data signal line is determined if data extracted from the management monitoring data region in the master station is "0".

10. The method for detecting the failure according to claim 1,
wherein the management data region comprises a management control data region on which data from the master station is superimposed and a management monitoring data region on which data from the slave station is superimposed, data other than "0" is used as data from the slave station to be superimposed on the management monitoring data region when a failure is detected, and disconnection of the common data signal line is determined if data extracted from the management monitoring data region in the master station is "0".

11. A method for detecting a failure in a control/monitoring signal transmission system in which a master station is connected with a plurality of slave stations via a common data signal line, and transmission of data is performed according to a transmission synchronization scheme, the method comprising:
acquiring, by the slave station, control data of an output part corresponding to a first slave station from a transmission signal as well as acquiring monitoring data from a transmission signal, the monitoring data being referred by the first slave station and being based on input information from an input part of a second slave station, the input part being in a correspondence relation with the output part;
obtaining, by the slave station, a pseudo input change timing equal to a true input change timing of the input part based on the monitoring data;
comparing, by the slave station, a time difference between an output change timing of the output part and the pseudo input change timing with a first threshold value and a second threshold value;
determining, by the slave station, a normal state when the time difference is larger than the first threshold value and smaller than the second threshold value, a first failure state when the time difference is smaller than the first threshold value, and a second failure state when the time difference is larger than the second threshold value; and
causing, by the slave station, a signal configuring data indicating the first failure state or the second failure state to be superimposed on a management data region.

12. The method for detecting the failure according to claim 11,
wherein a reference address indicating the second slave station of the control data or the monitoring data to be referred to is identical to an address of the first slave station.

13. The method for detecting the failure according to claim 11,
wherein a reference address indicating the second slave station of the control data or the monitoring data to be referred to is different from an address of the first slave station.

14. The method for detecting the failure according to claim 11,
wherein the management data region comprises a management control data region on which data from the master station is superimposed and a management monitoring data region on which data from the slave station is superimposed, data other than "0" is used as data from the slave station to be superimposed on the management monitoring data region when a failure is detected, and disconnection of the common data signal line is determined if data extracted from the management monitoring data region in the master station is "0".

15. A slave station connected to a common data signal line to which a master station is connected, comprising:
a synchronizing means for synchronizing with the master station;
an input means for acquiring input information from an input part corresponding to the slave station;
an output timing detecting means for acquiring control data of an output part which is in a correspondence relation with the input part from a transmission signal, and obtaining a pseudo output change timing equal to an output change timing of the output part;
a failure detecting means for comparing a time difference between the pseudo output change timing and an input change timing of the input part with a first threshold value and a second threshold value, and determining a normal state when the time difference is larger than the first threshold value and smaller than the second threshold value, a first failure state when the time difference is smaller than the first threshold value, and a second failure state when the time difference is larger than the second threshold value; and a management monitoring data transmitting means for causing a signal configuring data indicating the first failure state or the second failure state to be superimposed on the management data region in the transmission signal.

16. The slave station according to claim 15, further comprising,
a non-correspondence detecting means for determining that there is an error in a correspondence relation between the output part and the input part if there is input information from the input part but the control data of the output part which is in a correspondence relation with the input part indicates absence of an output.

17. A slave station connected to a common data signal line to which a master station is connected, comprising:
a synchronizing means for synchronizing with the master station;
a control data extracting means for acquiring control data related to an output part corresponding to the slave station terminal from a transmission signal on a common data signal line;
an input timing detecting means for acquiring monitoring data to be referred by the slave station and being based on input information from an input part which is in a correspondence relation with the output part from the transmission signal, and obtaining a pseudo input change timing equal to a true input change timing of the input part based on the monitoring data;
a failure detecting means for comparing a time difference between an output change timing of the output part and the pseudo input change timing with a first threshold value and a second threshold value, and determining a normal state when the time difference is larger than the first threshold value and smaller than the second threshold value, a first failure state when the time difference is smaller than the first threshold value, and a second failure state when the time difference is larger than the second threshold value; and
a management monitoring data transmitting means for causing a signal configuring data indicating the first failure state or the second failure state to be superimposed on the management data region in the transmission signal.

* * * * *